US005614135A

United States Patent [19]
Maleczek

[11] Patent Number: 5,614,135
[45] Date of Patent: Mar. 25, 1997

[54] MOULDING PROCESSES AND APPARATUS

[75] Inventor: Wojciech Maleczek, Donvale, Australia

[73] Assignee: Henderson's Industries Pty. Ltd., Victoria, Australia

[21] Appl. No.: 287,008

[22] Filed: Aug. 8, 1994

Related U.S. Application Data

[63] Continuation-in-part of Ser. No. 910,292, Sep. 21, 1992, abandoned.

[30]  Foreign Application Priority Data

Jan. 18, 1990 [AU] Australia ................... PJ 8228
Jan. 17, 1991 [WO] WIPO ............... PCT/AU91/00018

[51] Int. Cl.$^6$ ................................................ B29C 39/44
[52] U.S. Cl. ................. 264/40.4; 264/45.1; 425/4 R; 425/145
[58] Field of Search ................. 425/145, 4 C, 425/4 R; 264/45.1, 40.1, 40.4

[56]  References Cited

U.S. PATENT DOCUMENTS

| | | |
|---|---|---|
| 4,108,574 | 8/1978 | Bartley et al. . |
| 4,399,105 | 8/1983 | Tilgner et al. . |
| 4,430,287 | 2/1984 | Tilgner . |
| 4,474,310 | 10/1984 | Müller et al. . |
| 4,523,430 | 6/1985 | Masuda . |
| 4,525,134 | 6/1985 | McHenry et al. . |
| 4,571,319 | 2/1986 | Baluch et al. . |
| 4,904,913 | 2/1990 | Jones et al. . |

FOREIGN PATENT DOCUMENTS

| | | |
|---|---|---|
| 52792/79 | 5/1980 | Australia . |
| 30545/84 | 5/1985 | Australia . |
| 64842/86 | 5/1987 | Australia . |
| 2940208 | 4/1981 | Germany ................. 264/40.4 |
| 56-136346 | 10/1981 | Japan . |

*Primary Examiner*—Allan R. Kuhns
*Attorney, Agent, or Firm*—Evenson, McKeown, Edwards & Lenahan, P.L.L.C.

[57]  ABSTRACT

A process and apparatus is provided for the moulding of a product formed from the mixing of a plurality of different feedstocks where different ratios of the feedstock materials are required in different areas or sections of a mould to produce a product with different properties in the different areas or sections of the final moulded product. A plurality of streams of the different feedstocks, each from separate feedstock supply vessels, are combined to form a mixed feedstock in a delivery head or heads prior to delivery to the mould. Separate pumps are provided to deliver, at constant speed of operation, a predetermined volume of each feedstock at a predetermined flow rate to the mould during a moulding cycle, driven by an electric motor operating at constant speed under constant load. A first feedback control system for each feedstock stream detects variations in the feedstock flow rate by way of flow meters located between the pumps and the delivery head or heads, compares the flow rate with a predetermined flow rate and varies the speed of operation of the pump in response to variations from the predetermined flow rate.

20 Claims, 4 Drawing Sheets

MOULDING PROCESSES AND APPARATUS

This application is a continuation-in-part of U.S. application Ser. No. 07/910,292 filed on Sep. 21, 1992, now abandoned.

BACKGROUND OF THE INVENTION

This invention relates to improvements in synthetic plastic material moulding processes and apparatus and relates particularly but not exclusively to improvements in processes and apparatus for moulding foamable synthetic plastics materials such as polyurethane foam plastics materials or elastomeric materials.

In presently known processes for manufacturing moulded plastics material articles, feedstock materials required to produce the synthetic plastics material product are stored in separate storage vessels and are delivered at high pressure to a mixing and delivery head via separate supply lines. The feedstocks are intimately mixed due to the impingement of the feedstocks at high pressure in the mixing head immediately prior to delivery and pouring of the mixed feedstocks into a mould. Where the pouring of the mixed feedstock to a succession of moulds is intermittent, the mixing head provides for the recirculation of individual feedstocks to the respective storage vessels while a subsequent mould is being positioned in relation to the mixing head prior to the pouring of the mixed feedstock into the mould. The recirculation of the feedstocks is designed to maintain, as near as possible, a homogenous mix of the individual feedstocks and to maintain as near as possible a uniform temperature of the individual feedstocks at any point in time, in the feedstocks storage and delivery system.

The feedstocks are delivered to the mixing head by means of variable displacement hydraulic pumps driven at constant speed by constant speed (i.e., at constant speed under constant load) electric motors. The output of the pumps may be varied by adjusting the displacement of the pump by manual, mechanical, hydraulic or electrical means. Such adjustment of the feedstock pumps may be required to compensate for inherent variations in the volumetric output of the pumps caused by mechanical tolerances in the pumps or caused, in the long term, by wear of the pump or, in the shorter term, by variations in the speed of operation of the pump caused by variations in the speed of operation of the electric motor driving the pump. The variation in the speed of operation of the "constant speed" electric motors is caused by variations in the load placed on the motors due to variations in the physical properties (such as specific gravity, viscosity etc.) of the feedstocks being pumped. The physical property variations may be caused by variations in temperature or composition, for example, of one or more of the feedstocks. In the case of the production of foamed plastics material products, particularly foamed polyurethane materials, small variations in the output of the pumps can produce relatively large variations in the physical characteristics of the resultant foamed polyurethane product.

In the moulding of foam polyurethane products from polyol and isocyanate feedstocks, for example, it is possible for the volumetric output of the pumps to vary by ±1.5% for the polyol feedstock and by ±3.0% for the isocyanate feedstock. In the absence of any corrective measures, constant predetermined volumes of feedstock are not delivered via the mixing head to the mould. This results in the production of moulded products, over a period of time, with a variation in characteristics or properties which may be outside defined product tolerances. A high incidence of reject products can therefore result.

Such adjustment may also be required if different feedstock mixes are required in successive moulds of a series of different moulds or if different feedstock mixes are required in different sections of an individual mould to produce for example a foamed plastics material article having sections with different hardness or resiliency characteristics such as in a motor vehicle seat or back rest cushion.

The adjustment of the output of the pump by adjusting the displacement of the pump cannot be readily accomplished to compensate for inherent variations in output of the pump as the mechanical adjustment of the pump does not provide for sufficiently accurate volumetric adjustment. The volumetric output of the pumps may be manually varied to compensate for such change but such variation will still result in the production of unacceptable products as the variations are made only when noticeable changes in the physical characteristics of the product occur. The testing of the physical characteristics of a product is time consuming. Furthermore, as the products, in the case of foamed products, continue to cure after removal from a mould until a full cure is achieved, any testing of the characteristics must be made at a specified time after removal of a product from a mould for any meaningful comparison of products to be made and to determine whether any variation of pump output is required.

A high incidence of reject or unsatisfactory products can therefore result when the flow rates of the constituent feedstock materials delivered to the mould vary as a result of changes in process operating parameters and these flow rates are not adjusted instantaneously so as to remain within the find tolerances required to consistently produce a moulded foam end product with the desired material properties.

U.S. Pat. No. 4,571,319 (Baluch et al.) discloses a method and apparatus for manufacturing polymer articles which have different properties in different regions of the articles. However, this system has a number of disadvantages in production processes where the material properties of the moulded foam end product are particularly sensitive to the volumes of the various constituent feedstock materials combined. In such production processes, it is necessary to accurately and continuously control the flows of the various feedstock materials so as to consistently produce a moulded end product possessing the desired material properties.

The Baluch system disclosed in U.S. Pat. No. 4,571,319 is a hydraulically powered system in which the feedstock pumps supplying the various constituents are driven by hydraulic motors. In this system, the speed of operation of the hydraulic motors (and thus the speed of operation and output of the feedstock pumps) is varied by means of servo-valves. However, a servo controlled hydraulically powered moulding system of the type disclosed by Baluch lacks the degree of accuracy and responsiveness to fine and rapid adjustments often required in order to provide desired degree of control over the flow rates of the various constituent materials to consistently produce an end product with the desired properties.

Furthermore, the control system in Baluch et al. relies upon an analog tachometer and a digital encoder which are mechanically coupled to each motor/pump combination to provide feedback signals to the controller indicating pump speed and the amount of pump rotation. This system is based upon the premise that the tachometer signal as well as the encoder pulse rate are accurate representations of the material flow rate. Hence, in the Baluch system, the actual material flow rate is approximated by the tachometer and encoder signals. In particular, the signals from the tachometer and encoder represent the pump speed which is assumed to represent material flow rate. Therefore, in the Baluch system, the control system measures the theoretical flow rate by assuming that a given pump speed will accurately produce a certain flow rate of material. However, in practice, variations in individual feedstock temperatures, specific gravity and viscosity have the effect that the feedstock material flow rate will not be constant and/or repeatable for a given pump speed. Moreover, were in a feedstock pump will alter its output characteristics and result in a change in the pump output for a given speed over time. Thus, it is evident that this system cannot make compensations for such variations in individual feedstock temperatures, specific gravity and viscosity or for ware in individual feedstock pumps over time.

SUMMARY OF THE INVENTION

It is thus an object of the present invention to provide a process and apparatus for the production of moulded foam or elastomeric products which overcomes disadvantages of known processes and apparatus. In particular, an object of the present invention is to provide a process and apparatus for production of moulded foam or elastomeric products which can make compensations for variations in individual feedstock temperatures, specific gravity and viscosity or for wear in individual feedstock pumps over time and thus provide means for the production of moulded foam or elastomeric products which reduces the incidence of reject products to commercially acceptable levels.

To this end, the present invention provides a moulding process for the moulding of a product formed from the mixing of a plurality of different feedstocks where different ratios of the feedstock materials are required in different areas or sections of a mould to produce a product with different properties in said different areas or sections of the final moulded product in which a plurality of streams of the different feedstocks each from separate feedstock supply vessels are combined to form a mixed feedstock in a delivery head or heads prior to delivery to the mould, wherein separate pump means are provided to deliver, at constant speed of operation, a predetermined volume of each feedstock at a predetermined flow rate to the mould during a moulding cycle, driven by an electric motor operating at constant speed under constant load, and in which first feedback control means for each feedstock stream detects variations in the feedstock flow rate by way of flow meters located between said pump means and said delivery head or heads, compares the flow rate with a predetermined flow rate and varies the speed of operation of the pump in response to variations form the predetermined flow rate.

In another form, the present invention provides a moulding process in which a plurality of streams of different feedstocks each from separate feedstock supply vessels are combined to form a mixed feedstock in a delivery head or heads prior to delivery to one of a series of moulds, wherein separate pump means are provided to deliver, at constant speed of operation, a predetermined volume of each feedstock at a predetermined flow rate to the mould during a moulding cycle, driven by an electric motor operating at constant speed under constant load, and in which first feedback control means for each feedstock stream detects variations in the feedstock flow rate by way of flow meters located between said pump means and said delivery head or heads, compares the flow rate with a predetermined flow rate and varies the speed of operation of the pump in response to variations from the predetermined flow rate.

The present invention also provides a moulding apparatus in which a plurality of streams of different feedstocks each from separate feedstock supply vessels are combined to form a mixed feedstock in a delivery head or heads prior to delivery to one of a series of moulds, wherein separate pump means are provided to deliver, at constant speed of operation, a predetermined volume of each feedstock at a predetermined flow rate to the mould during a moulding cycle, said pump means driven by an electric motor capable of operating at constant speed under constant speed under constant load and in which first feedback control means are provided for each feedstock stream to detect variations in the feedstock flow rate by way of flow meters located between said pump means and said delivery head or heads, said first feedback control means comparing the flow rate with a predetermined flow rate and varying the speed of operation of the pump in response to variations from the predetermined flow rate.

Preferably, the pump means employed in the present invention includes a constant displacement pump or a variable displacement pump, set to deliver a predetermined volume of feedstock at a predetermined speed of operation.

It is further preferable that the first feedback control means for each feedstock stream controls the feedstock flow rate responsive to variations in the flow rate to within a set tolerance of the predetermined flow rate.

The present invention may also include a second feedback control means which identifies a particular mould of a series of moulds, selects the feedstock flow rates for the mould and sets the speed of operation of the feedstock pumps to the predetermined flow rates for the mould. The second feedback control means may vary the composition of the mixed feedstock by independently varying the feedstock flow rate of each of the different feedstocks in accordance with the mixed feedstock requirement for the mould.

The process and apparatus of the present invention are applicable to the moulding of a thermosetting polyurethane foam. In particular, the process and apparatus are applicable to the moulding of a thermosetting polyurethane foam in which there are one or two polyol feedstock compositions and one or two isocyanate feedstock compositions each having separate supply systems to the delivery head.

Other preferred features of the process and apparatus of the invention will be readily apparent from the following description.

BRIEF DESCRIPTION OF THE DRAWINGS

Preferred features of the process and apparatus of the invention will now be described with reference to the accompanying drawings in which.

DETAILED DESCRIPTION OF THE PREFERRED EMBODIMENTS

Figure 1:
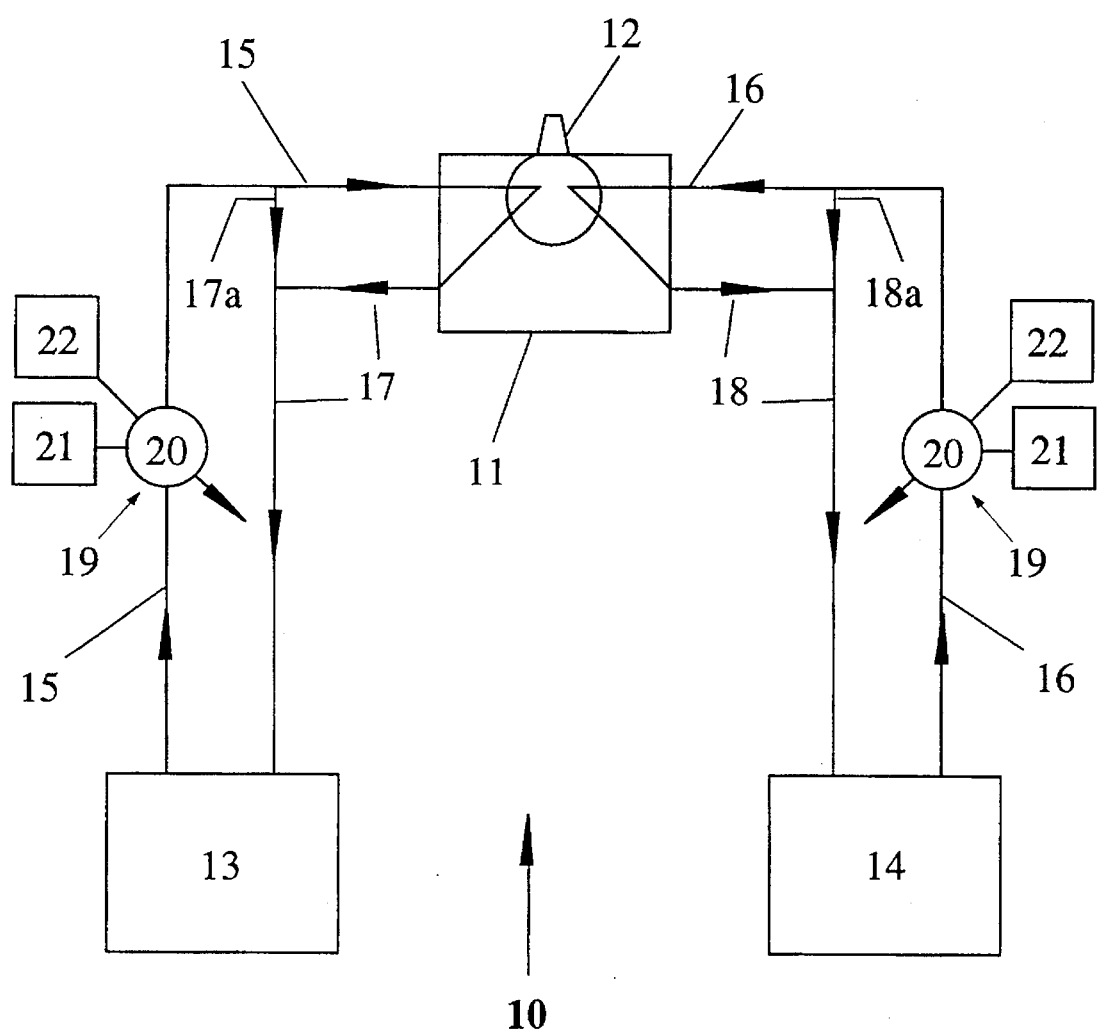
FIG. 1 is a schematic representation of known plastics material moulding apparatus.

Referring to FIG. 1, there is shown a moulding system 10 comprising a mixing head 11 including a dispenser or pour nozzle 12 connected to a first feedstock supply vessel 13 by supply line 15 and feedstock return line 17. Similarly, the mixing head 11 is connected to a second feedstock supply vessel 14 by supply line 16 and feedstock return line 18.

The system additionally includes feedstock recycle lines 17a and 18a including suitable valve means (not shown) to enable recycling of the feedstocks other than through the mixing head. This permits the system to operate in three modes;

a first or recycle mode when the feedstocks are recycled via lines 15, 17a and 17 or 16, 18a and 18;

a second or stand-by mode when the feedstocks are recycled via lines 15 and 17 or 16 and 18 through the mixing head 11 immediately prior to pouring; and a third or pour mode when the mixed feedstocks are dispensed via nozzle 12 to a mould (not shown).

The mixing head includes a dispenser or pour nozzle 12 to enable mixed feedstocks to be delivered to the mould for subsequent processing to form the desired moulded product. Storage vessel 13 may contain for example a polyol feedstock and storage vessel 14 appropriate isocyanate feedstock when the system is used to manufacture injection moulded foam polyurethane products. Each supply line 15, 16 includes a pump 19 to pump the feedstock materials in the system. The pumps operate at low pressure during the recycle mode and at high pressure during the stand-by or pour modes. The pumps deliver the feedstocks at high pressure to the mixing head 11 where mixing occurs by impingement of the feedstocks under the high pressure as the feedstocks are dispensed via nozzle 12 to the mould. The mixing head can be controlled to dispense mixed feedstocks into a mould or can be controlled to a stand-by mode to separately recirculate the respective feedstocks via line 17 and 18 to storage vessels 13 and 14. The stand-by mode is intended to maintain uniform composition and temperature of the feedstocks at high pressure immediately prior to the operation of the dispenser or pour mode for that particular mould. The recycle mode is operated while successive moulds are removed or positioned in relation to the mixing head.

Each of the pumps 19 comprises a variable output hydraulic pump 20 set to a specific output for any particular predetermined volume of feedstock depending on the composition of the mixed feedstock required for a particular injection moulding process. The pump 2 is driven by a constant speed electric motor 21. The output of the pump 20 may vary due to variations in ambient temperature or other conditions such as feedstock composition variations which affect the viscosity of the feedstock for example. Any such variation of the output of one pump not in accord with an equivalent variation in the operation of the other pump will result in a mixed feedstock of incorrect composition with regard to the relative volumes of the two feedstocks. Such variations lead to variations in the chemical and physical properties of the final moulded product which are difficult to control and lead to an unacceptably high level of reject products.

The output of the pump 20 may be varied by operation of electric, hydraulic or pneumatic servo-mechanism 22. The adjustment may be in response to perceived variations in the operation of the pump means such as a variation in the driving motor speed. Any adjustments made to not prevent the possibility of an incorrect volume of feedstocks being delivered to the mixing head as any adjustments made do not immediately rectify the perceived variation such that the vibration is corrected without resulting in an inferior product being moulded.

Such a conventional system displays substantial feedstock material flow variation for the reasons specified above. For example, in a system for injection moulding of foam polyurethane products, the typical volume accuracy values for the high viscosity (2000–2500 cp) polyol feedstock are ±1.5%. The volume accuracy value for the low viscosity (40–60 cp) is isocyanate feedstock is ±3.0%. Such variations either separately or combined, for example +1.5% with −3.0% lead to foam polyurethane products with an unacceptably high rate of product being outside designated chemical or physical tolerances. An unacceptably high rate of rejected products therefore follows as a consequence.

Figure 2:
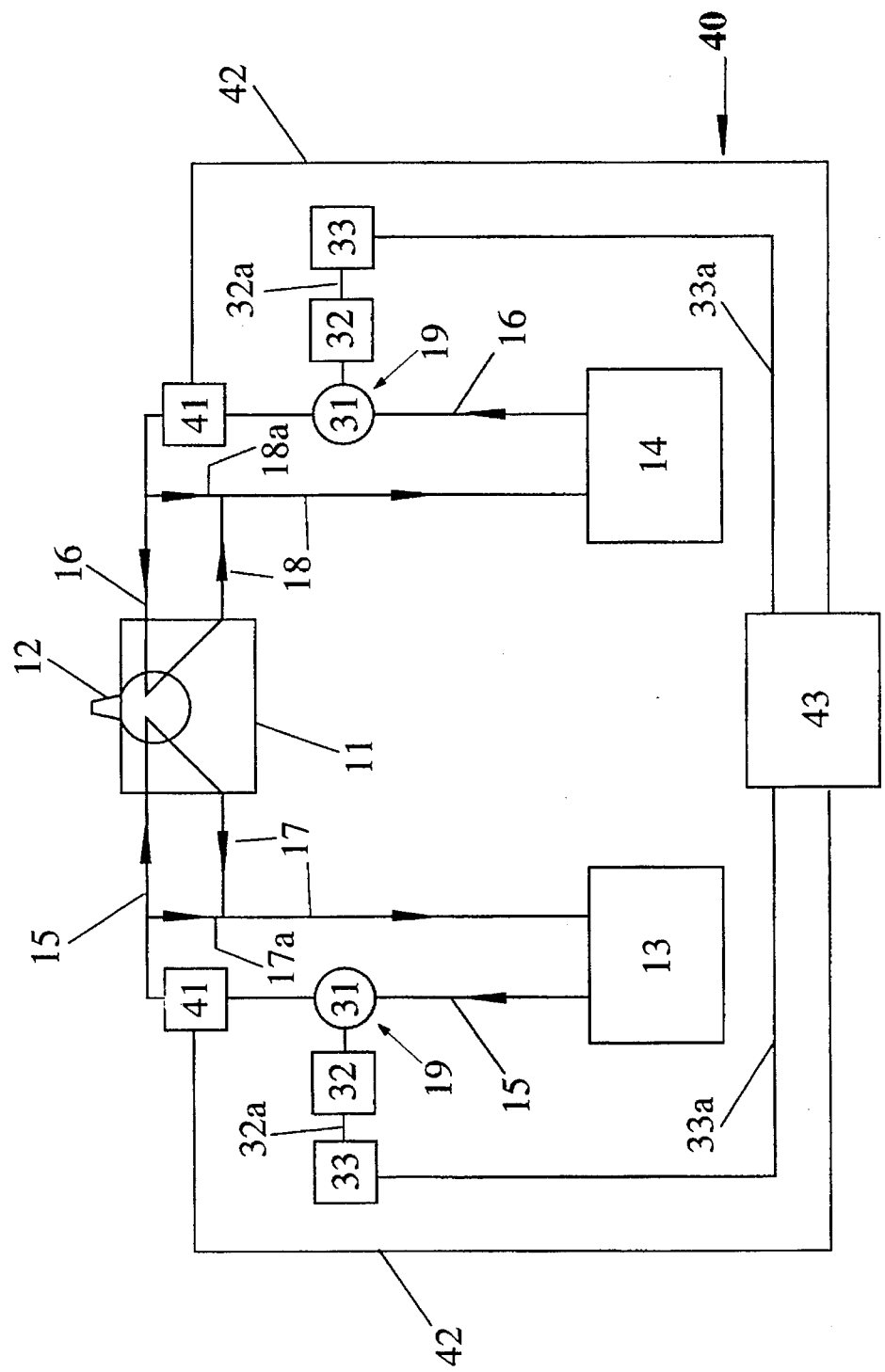
FIG. 2 is a schematic representation of a plastics material moulding apparatus in accordance with the present invention.

Referring to FIG. 2, there is shown an improved injection moulding system 40 in accordance with the present invention. Mixing head 11 is connected to supply vessels 13 and 14 by supply lines 15 and 16 and recycle lines 17a and 18a and return lines 17 and 18. The pumps 19 include a constant volume output pump 31 being a variable displacement pump set to deliver a predetermined constant volume of feedstock material at constant speed of operation. The pump 31 is driven by an electric motor 32 controlled by variable drive 33 via feedback line 32a. The system additionally includes flow meters 41 in high pressure supply lines 15 and 16 between the pumps 31 and the mixing head 11. These flow meters measure the actual volumetric flow rate of feedstock materials in the supply lines during the pour mode of operation of the system. The flow meters 41 generate and transmit signals to the process controller 43 via lines 42 which compares each signal with reference signals corresponding to predetermined feedstock volumes and flow rates. Where deviations occur from the reference signals, the process controller sends a command signal to the variable drive 33 via lines 33a to increase or decrease the speed of the motor 32 and thus to vary the output of pump 31 as required.

In a process for the moulding of a variety of different complex polyurethane moulded products from polyol and isocyanate feedstocks, it is possible using the present invention to accurately inject a plurality of different polyol-isocyanate feedstock mixtures into different portions of the mould by varying the volumes polyol feedstock and isocyanate feedstock introduced into different sections of the mould. It is also possible where the moulding system includes a variety of moulds for different products, to utilize a system with a second polyol storage vessel and appropriate pump, supply and control means to enable selection between tow differing polyol feedstock materials for pouring into different sections of a mould or for pouring into different moulds for differing product requirements. The series of moulds required for the various products may be arranged sequentially on a conveyor system such that the process controller can be readily programmed to identify each individual mould.

Figure 3:
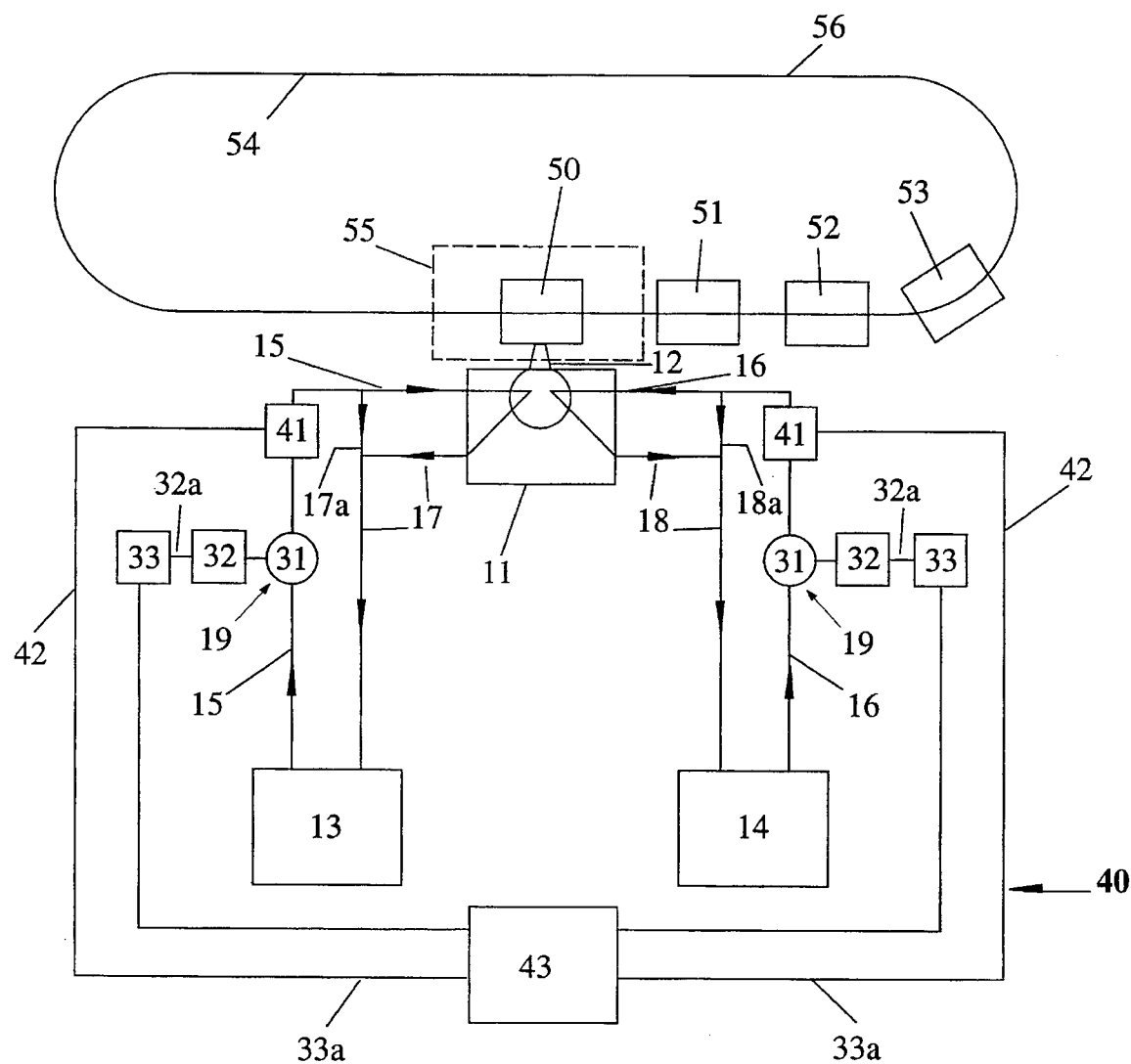
FIG. 3 is a schematic representation of a plastics material moulding apparatus including a plurality of moulds.

Referring to FIG. 3, there is shown a schematic representation of the moulding apparatus 40 of FIG. 2 in association with a production line 56 including a plurality of moulds 50, 51, 52 53. The moulding apparatus is as described in FIG. 2 with like parts having like numbering. The moulds 50 to 43 are mounted, along with other moulds (not shown) to circulate on a continuous production line 54. As mould 50 approaches pour zone 55 the system is in recycle mode where the feedstock materials are recycled at low pressure via supply line 15, 17a an 17 and 16, 18a and 18 respectively. As the mould 50 enters pour zones 55, the process controller identifies the mould and selects the appropriate predetermined feedstock material and flow rate volume for each feedstock and selects the stand-by mode wherein the feedstock materials are recycled at the normal operating pressure through the mixing head 11. The process controller continuously and accurately monitors the process parameters including the actual flow rate via flow meters 41 and selects pour mode to permit the feedstock materials to be mixed under pressure in the mixing head 11 and to be poured via nozzle 12 to mould 50. As the pour continues, the process controller 43 monitors the actual flow rate of feedstock materials and provides appropriate commands as necessary to variable drives 33 as required if the feedstock material flow rates vary from the predetermined flow rate for mould 50. When pouring of mould 50 has been completed, the process controller 43 sets the system to recycle mode and mould 50 passes from the pour zone 55. The cycle is repeated when the next mould 51 enters the pour zone with the process controller 43 selecting the appropriate predetermined feedstock material volumes and flow rates (which may be the same as or different from those of mould 50) for mould 51. Should mould 51 be a multi-section mould the process controller 43 selects the predetermined feedstock material volume and flow rate for each section of the mould.

Figure 4:
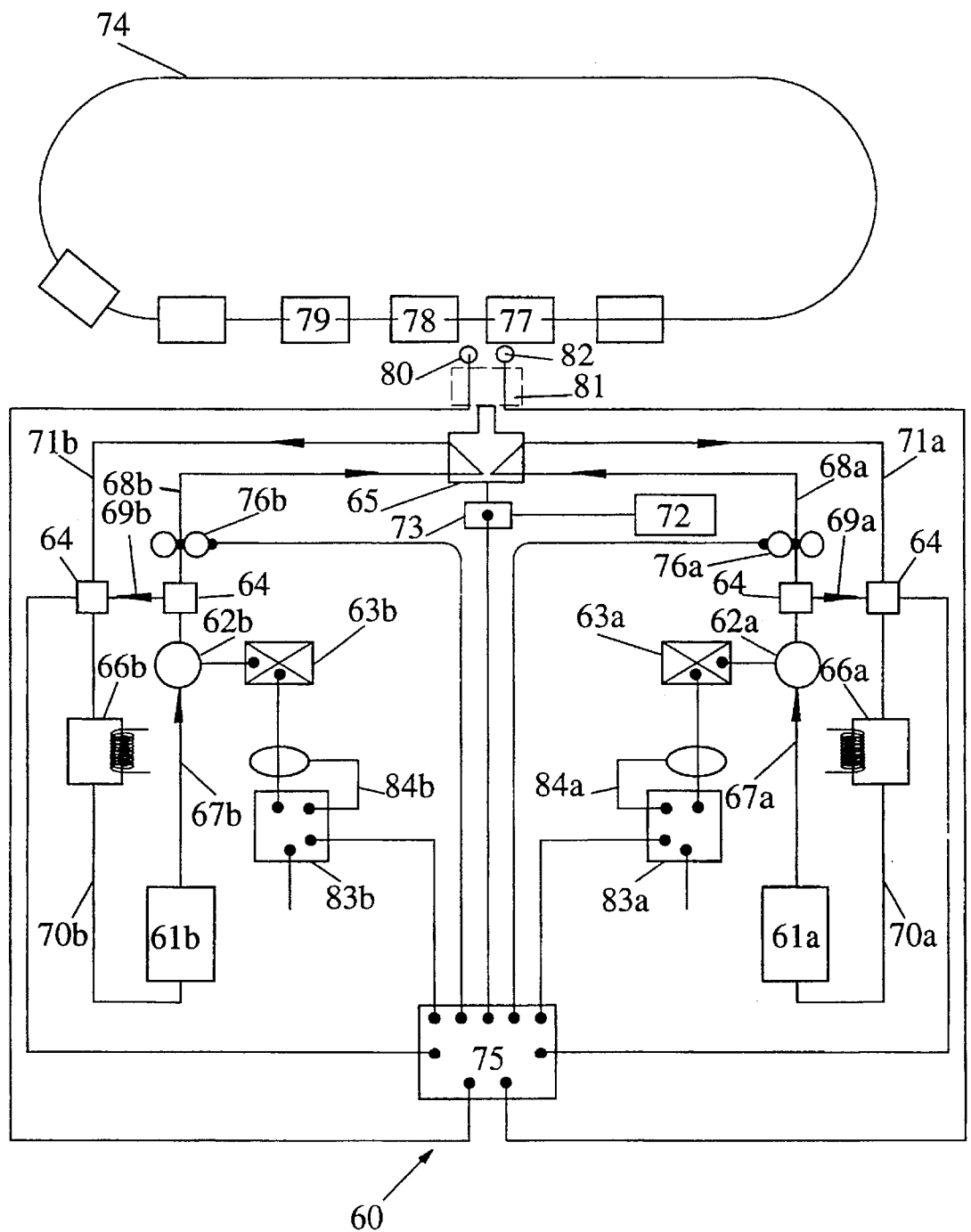
FIG. 4 is a schematic representation of a preferred plastics material moulding apparatus in accordance with the present invention.

Referring to FIG. 4, there is shown a particularly preferred plastics material moulding apparatus constructed in accordance with the present invention. The apparatus 60 includes a mould line 74 including a series of moulds 77, 78, 79 which successively pass moulding station or pour zone 81. The moulds are successively filled with mixed polyurethane/isocyanate moulding composition from mixing head 65 supplied with individual components via component pipelines 67, 68 from feedstock supply vessels 61. The components are delivered to the mixing head 65 by means of pumps 62. The present illustration is described in relation to the manufacture of polyurethane foam products and feedstock 61a is for example a polyol feedstock mix and feedstock 61b is a isocyanate feedstock mix.

The pumps 62, driven by electric motors 63, are controlled by frequency controllers 83 connected to the motors 63 to deliver a predetermined volume of feedstock at constant speed. Due to variations in ambient conditions, the load on the motor from the pump may tend to vary causing a variation in the speed of operation of the pump. This load variation is detected by the frequency controller which corrects the frequency of the pump motor to maintain the motor at a predetermined speed of operation and this maintains a predetermined speed of operation and delivery volume for the pump.

As the requirements of successive moulds or different cavities in a mould may be different as regards volumes of feedstock materials or ratios of feedstock materials the processor 75 sets the predetermined speed for a particular mould.

The mould carrier conveyor system 74 consists of a suitable drive (not shown in detail), conveying chain or carousel arrangement with attachments to accommodate desired number of moulds. A suitable mould heating and temperature control s©stem is provided to maintain required mould temperature in order to support the chemical process. The mould conveyor consists also of suitable means to provide moulds necessary actions such as closing, locking, tilting, opening, etc.

The entire moulding apparatus is controlled by a suitable control system such as a computer, a P.L.C. or a dedicated processor. The P.L.C. 75 has been chosen to accommodate all the field devices' inputs and outputs both digital and analogue.

The P.L.C. ("the processor") 75 is connected to all the field devices in order to be capable of making and sending appropriate signals to hold the production process with specification. The controller also has the capacity of performing some mathematic calculations including integration.

FIG. 4 illustrates a basic two chemical component or feedstock system. The chemical components (or feedstock) are stored in vessels 61 under constant and predetermined temperature. The feedstocks are fed via supply lines 67 to metering pumps 62 driven by suitable A.C. electric motors. Depending upon the position of the valve means 64, the chemicals can recirculate via lines 69 and 70 and heat exchangers 66 back to the storage vessels 61 (low pressure recirculation mode) or when the valve means 64 are directed by the controller 75 to assume an alternative position, the chemicals will recirculate from pump means 62 via flow meter means 76 and supply lines 68 to the mix head 65 and then via return lines 71 and the valve means 64, the heat exchangers 66 back to the feedstock supply 61 (high pressure circulation mode). In the present embodiment, the pump means 62 used are high pressure rotating pumps. However, any constant output rotating pump including a suitable gear pump will be effective if capable output rotating pump including a suitable gear pump will be effective if capable of delivering required output at required pressure, such as A2VK12 and A2VK28 Hydromatic or Rexroth. The pump means 62 run continuously so that by recirculation, the chemicals will retain constant temperature and viscosity. The system however, can run successfully in ON - Off mode was well, providing other adequate temperature control means are maintained.

During normal operation, the operation of the mould line causes successive moulds 77, 78, 79 to pass through the moulding station or pour zone 81. Each mould successively activates sensor 80 which signals to the controller 75 that a particular mould is approaching the moulding station 81. The controller 75 activates the valves 64 so that the system is in high pressure circulation mode with the feedstocks circulating via pipelines 67, 68, 71, 70 through the mixing head 65. At the same time, the pumps 62 are set to their predetermined speeds for each feedstock material in order to deliver the required volume of feedstock materials through the mixing head 65 to the particular mould or mould cavity within the moulding station or pour zone 81. The processor confirms that all operating parameters are correct and the activation of sensor 82 causes the mixing head to be operated by hydraulic controller 73 (provided by hydraulic source 72) to open the mixing head and permit the predetermined volume of mixed feedstock materials to pass into the mould. Once the pour mode is complete, the controller returns the system to the low pressure circulation mode by operation of valves 64 so that the feedstock materials recirculate via lines 67, 69, 70 to the feedstock supply 61 until the next mould triggers sensor 80 causing the cycle to be repeated.

In a further modification after the pour mode is complete, the controller 75 causes the mixing head 73 to be closed causing the system to remain in a high pressure recirculation mode for a few seconds over which time pulses generated by chemical stream flow meters means 76 are computed and compared with predetermined flow values. At that stage, the controller 75 causes the system to move to the low pressure recirculation mode awaiting for the next mould to activate the sensor 80 and then repeat the pouring sequence predetermined for the next mould. During the intervening time, the controller 75 performs further calculations. Having calculated the chemical flows, it computes how much if at all the flow rate has to be altered to meet the predetermined output values. When the sensor 80 is energized, new reference signals are generated by controller 75 and the calculated correction factors are applied to them to achieve the desired current frequencies in the frequency controller 83 to set the pump motor 63 (and thus the pump 62) to the predetermined speed of operation which in turn will generate the correct feedstock flows in the correct ratios.

As previously indicated, the speed of operation and thus the volume delivered by the pump 62a is determined by the speed of operation of the pump motor 63a. The speed of operation of the pump motor is controlled by frequency controller 83a which detects any changes from the speed of operation (predetermined for a particular mould by processor 75) caused by temperature or viscosity variations of feedstock materials which in turn result in variations in the load on the motor 62a and thus its speed of operation, and compensates for such changes in order to maintain the speed of operation at the predetermined speed (whatever that may be) for the particular mould about to be filled.

It will be apparent that the delivery of each feedstock 61a or 61b is independently controlled by the processor 75 to ensure that the feedstock materials are circulated and delivered to the mixing head in the correct volume to accurately control the composition of the final foamed product produced.

It will be readily apparent that the described apparatus may include more than one polyol or isocyanate feedstock so that differing polyol/isocyanate compositions may be delivered to a particular mould or section of a single mould. The apparatus may therefore include a second polyol and a second isocyanate feedstock supply system appropriately controlled by processor 75 to deliver either polyol or mixed polyol for example to a particular mould via one or more delivery or mixing heads.

A different combination of feedstock material volumes may be used for different sections of the mould to enable a product having controlled varying physical characteristics to be moulded. In the case of the production of moulded foam polyurethane products from a polyol feedstock material, the variation of the predetermined volume of the isocyanate feedstock material with respect to the polyol feedstock material in different sections of the mould will result in a foamed polyurethane product having varying hardness and/or resiliency characteristics in different sections of the final moulded product.

It will be evident therefore that accurate control of the actual volume of feedstock materials is possible as compared to known processes. In the processes of the present invention as applied to manufacture of injection moulded foamed polyurethane products, the volume accuracy of the polyol feedstock material is thus able to be controlled ±0.3% and the volume accuracy of the isocyanate feedstock is able to e controlled to +0.4%. The more accurate control of the feedstock materials in accordance with the present invention results in the unexpected reduction of "out of specification" final products by a factor of from 50 to 100.

It will be readily apparent that while the invention has been described with particular reference to the manufacture of foamed polyurethane moulded products, the process of the invention may be applied to any injection moulding process for producing either foam or elastomer products from two or more streams of feedstock materials. It will also be readily apparent that the process of the invention may be applied to a system in which a series of moulds require different feedstock combinations to produce a different desired product in a particular mould. The system of the invention may equally well be applied to the situation where a single mould may require different feedstock combinations in different areas of the mould to produce, in the case of a foam product, different resiliency or hardness in different areas or sections of the final foam moulded product.

In such cases, it may be desirable to include two or more different polyol feedstock and isocyanate feedstock supply systems including supply and recirculation lines, supply tanks and pump and control systems for each product stream. In such cases, the process controller includes means to recognize each individual mould and to control the mixing head to release the appropriate feedstock streams. The actual flow rates of the constituent feedstock materials being delivered are monitored and controlled as described with reference to FIGS. 2 and 3 so as to deliver accurate volumes of respective feedstock streams. The process of the invention is equally applicable to injection of mixed feedstock streams into an open mould which is subsequently closed or into a closed mould through an injection port.

The process and apparatus of the present invention is readily able to be adapted to accurately control delivery of mixed feedstocks from two or more feedstock supply vessels through one or more mixing or delivery heads.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A moulding process for the moulding of a product formed from the mixing of a plurality of different feedstocks where different ratios of the feedstock materials are required in different areas or sections of a mould to produce a product with different properties in said different areas or sections of a final moulded product in which a plurality of streams of the different feedstocks, each from separate feedstock supply vessels, are combined to form a mixed feedstock in at least one delivery head prior to delivery to the mould, wherein separate pump means are provided to deliver, at constant speed of operation, a predetermined volume of each feedstock at a predetermined flow rate to the mould during a moulding cycle, driven by an electric motor operating at constant speed under constant load, and in which first feedback control means for each feedstock stream detects variations in the feedstock flow rate from the predetermined flow rate by way of flow meters located between said pump means and said at least one delivery head, compares the flow rate with the predetermined flow rate, and varies the speed of operation of the pump in response to variations from the predetermined flow rate so that the predetermined volume of each feedstock is delivered to within an accuracy of +0.4%.

2. A process as claimed in claim 1, wherein said pump means includes one of a constant displacement pump and a variable displacement pump, set to deliver a predetermined volume of feedstock at a predetermined speed of operation.

3. A process as claimed in claim 2, wherein the first feedback control means for each feedstock stream controls the feedstock flow rate responsive to variations in the flow rate to within a set tolerance of the predetermined flow rate.

4. A process as claimed in claim 1, wherein a second feedback control means identified a particular mould of a series of moulds, selects the feedstock flow rates for the mould and sets the speed of operation of the feedstock pumps to the predetermined flow rates for the mould.

5. A process as claimed in claim 4, which the second feedback control means varies the composition of the mixed feedstock by independently varying the feedstock flow rate of each of the different feedstocks in accordance with the mixed feedstock requirement for the mould.

6. A process as claimed in claim 1, in which the process is a thermosetting polyurethane foam moulding process.

7. A process as claimed in claim 6, in which there are one or two polyol feedstock compositions and one or two isocyanate feedstock compositions, each having separate supply systems to the delivery head.

8. A moulding process in which a plurality of streams of different feedstocks, each from separate feedstock supply vessels, are combined to form a mixed feedstock in at least one delivery head prior to delivery to one of a series of moulds, wherein separate pump means are provided to deliver, at constant speed of operation, a predetermined volume of each feedstock at a predetermined flow rate to the mould during a moulding cycle, driven by an electric motor operating at constant speed under constant load, and in which first feedback control means for each feedstock stream detects variations in the feedstock flow rate from the predetermined flow rate by way of flow meters located between said pump means and said at least one delivery head, compares the flow rate with the predetermined flow rate, and varies the speed of operation of the pump in response to variations from the predetermined flow rate so that the predetermined volume of each feedstock is delivered to within an accuracy of +0.4%.

9. A process as claimed in claim 8, wherein said pump means includes one of a constant displacement pump and a variable displacement pump, set to deliver a predetermined volume of feedstock at a predetermined speed of operation.

10. A process as claimed in claim 8, wherein the first feedback control means for each feedstock stream controls the feedstock flow rate responsive to variations in the flow rate to within a set tolerance of the predetermined flow rate.

11. A process as claimed in claim 8, wherein a second feedback control means identifies a particular mould of a series of moulds, selects the feedstock flow rates for the mould and sets the speed of operation of the feedstock pumps to the predetermined flow rates for the mould.

12. A process as claimed in claim 11, in which the second feedback control means varies the composition of the mixed feedstock by independently varying the feedstock flow rate of each of the different feedstocks in accordance with the mixed feedstock requirement for the mould.

13. A process as claimed in claim 8, in which the process is a thermosetting polyurethane foam moulding process.

14. A process as claimed in claim 13, in which there are one or two polyol feedstock compositions and one or two isocyanate feedstock compositions each having separate supply systems to the delivery head.

15. A moulding apparatus in which a plurality of streams of different feedstocks, each from separate feedstock supply vessels, are combined to form a mixed feedstock in at east one delivery head prior to delivery to one of a series of moulds, comprising:

separate pump means provided to deliver, at constant speed of operation, a predetermined volume of each feedstock at a predetermined flow rate to the mould during a moulding cycle;

an electric motor driving said pump means, said electric motor being capable of operating at constant speed under constant load;

a flow meter located between each of said separate pump means and said at least one delivery head; and first feedback control means provided for each feedstock stream to detect variations in the feedstock flow rate from the predetermined flow rate by way of said flow meter, said first feedback control means comparing the flow rate with the predetermined flow rate and varying the speed of operation of the pump in response to variations from the predetermined flow rate so that the predetermined volume of each feedstock is delivered to within an accuracy of +0.4%.

16. Apparatus as claimed in claim 15, wherein said pump means includes one of a constant displacement pump and a variable displacement pump, set to deliver a predetermined volume of feedstock at a predetermined speed of operation.

17. Apparatus as claimed in claim 15, wherein the first feedback control means for each feedstock stream includes means to control the feedstock flow rate responsive to variations in the flow rate to within a set tolerance of the predetermined flow rate.

18. Apparatus as claimed in claim 16, further comprising a second feedback control means, wherein said second feedback control means includes means for identifying a particular mould of said series of moulds, means for selecting the feedstock flow rates for the mould, and means for setting the speed of operation of the feedstock pumps to the predetermined flow rates for the mould.

19. Apparatus as claimed in claim 18, in which the second feedback control means includes means for varying the composition of the mixed feedstock by independently varying the feedstock flow rate of each of the different feedstocks in accordance with the mixed feedstock requirement for the mould.

20. Apparatus as claimed in claim 15, in which there are one or two polyol feedstock compositions and one or two isocyanate feedstock compositions each having separate supply systems to the delivery head.

* * * * *